United States Patent [19]

Sawko et al.

[11] 4,184,021

[45] Jan. 15, 1980

[54] AMBIENT CURE POLYIMIDE FOAMS PREPARED FROM AROMATIC POLYISOCYANATES, AROMATIC POLYCARBOXYLIC COMPOUNDS, FURFURYL ALCOHOL, AND A STRONG INORGANIC ACID

[76] Inventors: Robert A. Frosch, Administrator of the National Aeronautics and Space Administration, with respect to an invention of Paul M. Sawko; Salvatore R. Riccitiello, both of San Jose, Calif.; Charles L. Hamermesh, Westlake Village, Calif.

[21] Appl. No.: 956,161

[22] Filed: Oct. 31, 1978

[51] Int. Cl.² .............................................. C08G 18/14
[52] U.S. Cl. .................................. 521/106; 521/114; 521/119; 521/120; 521/129
[58] Field of Search ............... 521/106, 114, 119, 120, 521/129; 528/49

[56] References Cited

U.S. PATENT DOCUMENTS

| | | |
|---|---|---|
| 3,620,987 | 11/1971 | McLaughlin et al. ................ 521/118 |
| 3,644,234 | 2/1972 | Grieve ................................... 521/121 |
| 3,772,216 | 11/1973 | Rosser ................................... 521/118 |
| 3,849,972 | 11/1974 | Pepmeier et al. ........................ 53/221 |
| 3,865,757 | 2/1975 | Wade .................................... 521/137 |

Primary Examiner—Maurice J. Welsh
Attorney, Agent, or Firm—Armand McMillan; John R. Manning; Darrell G. Brekke

[57] ABSTRACT

Flame and temperature resistant polyimide foams are prepared by the reaction of an aromatic dianhydride, e.g., pyromellitic dianhydride, with an aromatic polyisocyanate, e.g., polymethylene polyphenylisocyanate (PAPI) in the presence of an inorganic acid and a lower molecular weight alcohol, e.g., dilute sulfuric acid or phosphoric acid and furfuryl alcohol.

The exothermic reaction between the acid and the alcohol provides the heat necessary for the other reactants to polymerize without the application of any external heat. Such mixtures, therefore, are ideally suited for in situ foam formation, especially where the application of heat is not practical or possible.

5 Claims, No Drawings

AMBIENT CURE POLYIMIDE FOAMS PREPARED FROM AROMATIC POLYISOCYANATES, AROMATIC POLYCARBOXYLIC COMPOUNDS, FURFURYL ALCOHOL, AND A STRONG INORGANIC ACID

ORIGIN OF THE INVENTION

The invention described herein was made in the performance of work under a NASA contract and subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention relates to flame-resistant polyimide foam insulation prepared from polyisocyanates and aromatic polycarboxylic compounds.

2. Description of the Prior Art

The preparation of polyimide foams from polyisocyanates and aromatic polycarboxylic acid derivatives has generally been accomplished heretofore in the presence of various catalysts and with suitable heating. Rosser, for example, teaches in U.S. Pat. No. 3,772,216 that such foams may be prepared at temperatures of about 90° to 300° C. in the presence of an alkanolamine. While the products thus obtained possess excellent fire-retarding properties, their application has had to be restricted to situations where the required heating is practical. Other processes have been disclosed by which this type of foam can be prepared without recourse to external heat, thus allowing the material to be formed in situ, e.g. between walls, on walls or in similar places. This has been accomplished by the use of catalysts of a tertiary amine and an aliphatic alcohol containing one to six carbon atoms (McLaughlin, U.S. Pat. No. 3,620,987) or a monomeric homocyclic polyepoxide (Grieve, U.S. Pat. No. 3,644,234).

More recently, tertiary amines have been used with furfuryl alcohol as catalyst for condensing a polyisocyanate with a suitable active-hydrogen compound to obtain foam containing carbodiimide and isocyanurate linkages (Narayan et al, U.S. Pat. No. 3,894,972.

Strong organic acids such as formic acid and chloroacetic acid, have been used with aromatic isocyanates and carboxylic acids to produce amide rather than urea linkages (Phillips et al, "Polyurethanes", 1964, pages 108–110). Sulfuric acid, interalia, has been used with teriary alcohols and polycarboxylic acids to form an intermediate alkyd resin which is then foamed with a polyisocyanate (Hindersinn et al, U.S. Pat. No. 2,865,869). It is interesting to note that this process is said to greatly reduce the heat normally liberated during foaming and thus prevent the charring which often occurs in lightweight foams. La Spina et al., (U.S. Pat. No. 3,931,059), have disclosed the preparation of polycarbodiimide foams from a polyisocyanate, using a pH 1 to 8 protonic acid and an alcohol in the presence of a phosphine oxide or sulfide catalyst, while Stierling, on the other hand, formed expanded-in-place cellular bodies from a thermosetting phenolaldehyde resin and an exothermic mixture of hydrogen peroxide and, e.g., sulfuric acid or phosphoric acid.

The object of the present invention is to provide a simple quick process to form polyimide foams in situ from components which have shown a tendency to char when brought together in the presence of a strong acid.

Another object is to obtain low density cellular products that have excellent flame resistance and insulation properties.

SUMMARY OF THE INVENTION

It has now been discovered that uniform lightweight flame resistant thermally stable polyimide foams of acceptable mechanical strength and integrity can be produced from an aromatic polycarboxylic acid dianhydride and an aromatic polyisocyanate in the presence of furfuryl alcohol and an inorganic acid. The alcohol and the acid, e.g., phosphoric acid, produce a vigorous exothermic reaction which provides all the heat necessary for the formation of the polyimide structure. External heating is eliminated, thereby allowing formation of the foam in any shape and location desired.

DETAILED DESCRIPTION OF THE INVENTION

The foams of the present invention are made from aromatic polycarboxylic dianhydrides in the presence of furfuryl alcohol and a strong inorganic acid such as phosphoric acid, polyphosphoric acid, hydrochloric acid, nitric acid and sulfuric acid. Some of these acids, especially the last two named, may have to be diluted with water to control the exothermic reaction that they produce and to avoid carbonization of certain foam components.

The aromatic acids or anhydrides which can be used to prepare the foams of this invention comprise such polycarboxylic compounds as can form intramolecular anhydride and, after reaction with an isocyanate group, imide linkages. Example of such compounds include the following polycarboxylic acids and their anhydrides: pryomellitic acid, trimellitic acid, mellophanic acid, benzene-1,2,3,4-tetracarboxylic acid, benzene-1,2,3-tricarboxylic acid, diphenyl-3,3',4,4'-tetracarboxylic acid, diphenyl-2,2',3,3'-tetracarboxylic acid, naphthalene-2,3,6,7-tetracarboxylic acid, naphthalene-1,2,4,5-tetracarboxylic acid, naphthalene-1,4,5,8-tetracarboxylic acid, as well as similar tetracarboxylic derivatives of phenanthrene, perylene, diphenyl methane, diphenyl sulfone, diphenyl ether, benzophenone, and the like.

As polyisocyanates, there may be used aromatic compounds that contain at least two isocyanate groups and are normally liquid or can become liquid at reaction temperatures. The preferred compounds have at least two aromatic rings with one isocyanate group on each ring. These rings may be connected together as in biphenyl, or interconnected by either carbonyl, sulfone, methylene or oxygen linkages. Examples of suitable compounds are: diphenylmethane-4,4'-diisocyanate, 3,3'-dimethyldiphenylmethane-4,4'-diisocyanate, 3, 3'-dimethyldiphenylmethane-4,4'-diisocyanate, biphenyl diisocyanate, diphenylsulfone diisocyanate, and the like. Particularly useful are polymethylenephenylene polyisocyanate and 4,4'-diphenylenemethylene diisocyanate. Examples of monophenylene polyisocyanates are toluene diisocyanate, m-phenylene diiosocyanate, and xylylene diisocyanate.

Ratios of polyisocyanates to aromatic acid derivatives are conventionally adjusted so that there is not a large excess of either component. In a suitable formulation, the equivalent weight ratio of the polyisocyanate to the polyfunctional aromatic acid derivative is about 0.6 to 4.0. Thus, in accordance with the present invention satisfactory foams can be prepared by mixing 100 parts by weight of an aromatic anhydride, such as pyromellitic dianhydride, with 100 to 500 parts by weight of an aryl polyisocyanate, such as poly(methylenephenylene) polyisocyanate. Preferred ratios of diisocyanate to dianhydride are about 150 to 300 parts by weight to 100 parts by weight, respectively.

While it has been found that the preferred ratio of acid to furfuryl alcohol is about 1:10, with both compounds constituting about 52% of the foam starting ingredient mix, both these ratios and contents may be varied to accomodate various mixtures of monomers of differing nature. With this in mind, these components may vary between about 2 and 10%, for the acid, and about 43 and 55%, for the furfuryl alcohol.

The compositions also contain a silicone oil surfactant which may be a block copolymer of a polysiloxane and a polyalkylene oxide such as are commercially available as Dow Corning DC 193 or 195, and are disclosed in U.S. Pat. No. 3,518,288, U.S. Pat. No. Re. 25,727 and German Pat. No. 1,923,679. At least 2% by weight, preferably about 2 to 10% of such silicone foam stabilizers is employed in the reaction.

In addition to the essential ingredients just described, it is contemplated that various other materials may be incorporated in the formulations to achieve certain particular effects deemed desirable for certain particular uses. Thus, there may be added organic and inorganic fibers, particulate fillers, coloring agents, fungicides and other preservatives, waterproofing substances, and the like, all in conventional quantities to accomplish conventional purposes.

The foams of the invention can be produced in situ by mixing the ingredients together and either pouring the mixture into a mold or spraying it onto a substrate.

When spraying is in order, a Gussmer Type FF system may be employed, which consists basically of: two-liter pressure pots; a positive displacement pump system with volume ratio controlled by using cylinders of different volume in appropriate combinations; flexible hoses leading from pots to pump intake and from pump outlet to spray gun; and combined mixing chamber and spray gun.

With a spraying system of this type, the two components required consist of stable mixtures of, for example (A) polymethylene polyphenyl isocyanate (PAPI 901) with phosphoric acid, and (B) furfuryl alcohol with pyromellitic dianhydride and foam stabilizer (DC 193). In this instance, the volume ratio of Component A to Component B is 1:2 so that a 30/60 cylinder combination would be used for pumping and metering. The short potlife of Component A at 25° C. requires that the isocyanate be chilled to 5° C. prior to mixing with the acid and that the resulting mixture in the pressure pot be kept in an ice bath. Component B is stirred constantly, e.g. with a magnetic stirrer, during spraying in order to maintain a uniform dispersion of the pyromellictic dianhydride powder. Component A hose and the mixing chamber, on the other hand, are each heated to about 40° C. to counteract the effect of the prechilling. Alternatively, the acid may be kept separate from the isocyanate until final mixing with Component B, thus giving a three component system with a pot life sufficiently increased so that the need for cooling is eliminated.

The process of the invention wil now be illustrated with several embodiments, including the best mode of practicing the invention as presently conceived.

As summarized in Table 1, various compositions have been used which contain different levels of phosphoric acid (Example 1 to 3), dilute sulfuric acid (Example 4), hydrochloric acid (Example 5), polyphosphoric acid (Example 6), and dilute nitric acid (Example 7).

TABLE 1
FOAM COMPOSITION USING VARIOUS ACIDS

| INGREDIENTS | WEIGHT (GRAMS) EXAMPLES | | | | | | |
|---|---|---|---|---|---|---|---|
| | 1 | 2 | 3 | 4 | 5 | 6 | 7 |
| Polymethylene polyphenyl isocyanate, PAPI 91* | 30.4 | 14.4 | 30.4 | 30.4 | 30.4 | 30.4 | 30.4 |
| Pyromellitic Dianhydride | 15.3 | 28.7 | 14.0 | 15.3 | 15.3 | 15.3 | 15.3 |
| Silicone Surfactant, DC 193** | 2.3 | 3.0 | 2.3 | 2.3 | 2.3 | 2.3 | 2.3 |
| Furfuryl Alcohol | 47.3 | 47.9 | 44.5 | 47.3 | 47.3 | 47.3 | 47.3 |
| Phosphoric Acid, concentrated | 4.7 | 6.0 | 9.5 | — | — | — | — |
| Sulfuric Acid/Water: 50/50 | — | — | — | 4.7 | — | — | — |
| Hydrochloric Acid, concentrated | — | — | — | — | 4.7 | — | — |
| Polyphosphoric Acid, 83% as $P_2O_5$ | — | — | — | — | — | 4.7 | — |
| Nitric Acid/Water: 50/50 | — | — | — | — | — | — | 4.7 |
| | 100.0 | 100.0 | 100.7 | 100.0 | 100.0 | 100.0 | 100.0 |

*Described in U.S. Pat. 2,683,738 and German Patent 1,923,679
**Synthesis and Properties of Siloxane-Polyether Copolymer Surfactant, Vol. 6, No. 2, Industrial and Engineering Chemistry, Product Research and Development (June, 1967).

The foams produced with the components of Example 1 and 2 were subjected to fire tests to demonstrate the fire burn-through resistance of such internally heated polyimide foams. The tests were carried out in the NASA T-3 Fire Facility which consists essentially of a firebrick box provided with an oil-burner, a chimney, and means to expose a sample to be tested to a controlled flux of heat originating from a combination of radiant and convective heat sources. In the present instance, a JP-4 jet fuel flame was used to generate temperatures of about 1000° C. and a heat flux of about 110 to 120 w/m² at the surface of a 12×12×12 inch sample. A more detailed description of the equipment and the test can be found in the Journal of Fire and Flammability, Volume 6, pages 205-221 (April 1975).

The results of the burn-through tests are summarized in Table 2.

TABLE 2

| COMPARISON OF JP-4 FUEL BURN-THROUGH TESTS | | | |
|---|---|---|---|
| Foam Type | Density (g/cc) | Burn-Through Time (sec.) | Comments |
| Prior Art[a] Foam | 0.048 | 474 | Fissures, shrinkage distortion, burn-through |
| Example 1 | 0.016 | 405[b] | Stable |
| Example 2 | 0.008 | 191[b] | No burn-through Stable |

TABLE 2-continued

| COMPARISON OF JP-4 FUEL BURN-THROUGH TESTS | | | |
|---|---|---|---|
| Foam Type | Density (g/cc) | Burn-Through Time (sec.) | Comments |
| | | | No burn-through |

[a] U.S. Pat. No. 3,722,216 - Example 1.
[b] Test terminated, no obvious deterioration.

As the results demonstrate, the polyimide foams prepared with internal heat provided by the incorporation of furfuryl alcohol and phosphoric acid are resistant to burn-through penetration of a JP-4 fuel fire even though their density is only one-third and one-sixth, respectively, of that of prior art foam prepared with external heating.

Other properties of the foam products made with the five acids shown in the examples were investigated and the results obtained are shown in Table 3 and Table 4. In these examples (1 and 4 to 7), as shown in Table 1, the same quantities of isocyanate, pyromellitic dianhydride, furfuryl alcohol, and acid were used, namely 30.4, 15.3, 47.3, and 4.7 parts by weight, respectively. In addition, the thermogravimetric properties of these foams were compared to those produced with the help of another of the exothermic reaction systems disclosed by McLaughlin et al., U.S. Pat. No. 3,620,987. Of the different amine alcohol pair suggested in that patent, triethylene diamine and methyl alcohol were selected for the simple reason of ready availability. These prior art preparations, therefore, were identical to those just described, except that the acid and the furfuryl alcohol were replaced with 2 parts triethylene diamine and 4 parts methyl alcohol, in one instance (Example 8), and half these quantities in another instance (Example 9). In both cases, a friable porous mass was produced which was unsatisfactory for insulation purposes.

As these results demonstrate, the acid furfuryl alcohol process of the invention yields foams of very low density that posses the excellent thermal properties indicative of aromatic polyimide linkages. In contrast, the significantly lower char yields and initial decomposition temperatures shown by foams produced with the triethylenediamine/methyl alcohol exothermic system would seem to indicate that at least with pyromellitic dianhydride and polymethylene polyphenyl isocyanate, the system fails to achieve the extent of reaction necessary to achieve the desired thermal properties.

Some of the mechanical properties of the foam of the invention were determined and found to be statisfactory for the products to be handled in a normal manner and serve as insulation. These properties are summarized in Table 4. It should be noted that the foams of Examples 8 and 9, made with the amine/methanol system, were not tested because of their lack of structural integrity.

TABLE 4

SOME MECHANICAL PROPERTIES OF FOAMS GENERATED WITH VARIOUS ACIDS

| Example | Acid Type | Compressive Strength, psi. 10% | Compressive Strength, psi. 50% | Ultimate Strength, psi. | Compressive Modulus, psi. |
|---|---|---|---|---|---|
| 1 | Phosphoric | 3.77 | 7.11 | 1.80 | 20.23 |
| 4 | Sulfuric | 4.12 | 6.58 | 1.86 | 20.12 |
| 5 | Hydrochloric | 3.35 | 5.05 | 1.30 | 15.87 |
| 6 | Polyphosphoric | 3.20 | 6.42 | 1.60 | 15.07 |

What is claimed is:

1. In a process for the preparation of a high temperature resistant foam by reaction of an aromatic polyisocyanate and an aromatic polycarboxylic compound, the improvement comprising carrying out the reaction in the presence of furfuryl alcohol and a strong inorganic acid.

2. The process of claim 1 wherein the acid is selected from the group consisting of dilute sulfuric acid, hydrochloric acid, phosphoric acid, polyphosphoric acid, and dilute nitric acid.

3. The process of claim 1 wherein the polycarboxylic is an aromatic tetracarboxylic dianhydride.

4. The process of claim 3 wherein the dianhydride is pyromellitic dianhydride and the isocyanate is polymethylene polyphenyl polyisocyanate.

5. The process of claim 1 wherein the furfuryl alcohol and the acid are present in a weight ratio of about 10 to 1 and together constitute about 50% of the foam components.

TABLE 3

PROPERTIES OF FOAM GENERATED WITH VARIOUS ACIDS AND A BASE

| Example | Acid or Base | Density g/cc | Char Yield 800° C.[a] | Initial Decomposition Temp., °C.[a] | % Weight Loss | Char Recession cm [b] |
|---|---|---|---|---|---|---|
| 1 | Phosphoric | 0.008 | 54 | 325 | 19 | .59 |
| 4 | Sulfuric | 0.008 | 48 | 370 | 25 | .64 |
| 5 | Hydrochloric | 0.008 | 48 | 340 | 23 | .36 |
| 6 | Polyphosphoric | 0.010 | 58 | 250 | 19 | .44 |
| 7 | Nitric | 0.011 | 51 | 350 | 21 | .27 |
| 8 | Trimethylene diamine | — | 36 | 190 | — | — |
| 9 | Trimethylene diamine | — | 34 | 190 | — | — |

[a] Obtained from thermogravimetric analysis at heating rate of 10° C./min. under nitrogen.
[b] Obtained from propane torch flame impinging on a 7.6 cm × 7.6 cm × 2.5 cm foam specimen mounted 3.5 cm from tip of flame for 2 minutes.